United States Patent
Morinaga et al.

(10) Patent No.: US 8,547,858 B2
(45) Date of Patent: Oct. 1, 2013

(54) COMMUNICATION-QUALITY MEASURING APPARATUS, COMMUNICATIONS TERMINAL DEVICE, COMMUNICATION-QUALITY MEASURING METHOD, AND COMPUTER PROGRAM

(75) Inventors: Masanobu Morinaga, Kawasaki (JP); Noriyuki Fukuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/356,809

(22) Filed: Jan. 21, 2009

(65) Prior Publication Data
US 2009/0185504 A1    Jul. 23, 2009

(30) Foreign Application Priority Data
Jan. 21, 2008  (JP) .................................. 2008-010709

(51) Int. Cl.
    *H04L 12/26*     (2006.01)
(52) U.S. Cl.
    USPC ......... 370/252; 370/232; 370/235.1; 370/229
(58) Field of Classification Search
    None
    See application file for complete search history.

(56) References Cited

U.S. PATENT DOCUMENTS

| | | | |
|---|---|---|---|
| 6,526,059 B1 | 2/2003 | Yamazaki | |
| 7,680,205 B2 * | 3/2010 | Ariyavisitakul | 375/267 |
| 2002/0188748 A1 * | 12/2002 | Blackwell et al. | 709/232 |
| 2005/0182850 A1 * | 8/2005 | Kohno | 709/236 |
| 2007/0237187 A1 * | 10/2007 | Aoki | 370/535 |
| 2007/0258383 A1 * | 11/2007 | Wada | 370/252 |
| 2008/0216074 A1 * | 9/2008 | Hass et al. | 718/100 |
| 2009/0109858 A1 * | 4/2009 | Yamasaki et al. | 370/242 |

FOREIGN PATENT DOCUMENTS

| | | |
|---|---|---|
| JP | 2000-41046 A | 2/2000 |
| JP | 2003-244238 A | 8/2003 |

* cited by examiner

*Primary Examiner* — Kibrom T Hailu
*Assistant Examiner* — Zewdu A Beyen
(74) *Attorney, Agent, or Firm* — Fujitsu Patent Center (57) ABSTRACT

A communication-quality measuring method disclosed in the present invention acquires packets to be transferred in a packet switching network and accumulates the acquired packets in an internal buffer. An acquisition amount indicating an amount of packets acquired per given unit time, a loss amount indicating an amount of packets lost during transfer in the packet switching network, and an acquisition leak amount indicating an amount of packets that cannot be accumulated in the internal buffer out of the acquired packets are measured. Based on the measured acquisition amount, loss amount, and acquisition leak amount, a packet loss rate transferred in the packet switching network and an error for the loss rate are calculated and the calculated loss rate and the loss rate error are output.

13 Claims, 8 Drawing Sheets

COMMUNICATION-QUALITY MEASURING APPARATUS, COMMUNICATIONS TERMINAL DEVICE, COMMUNICATION-QUALITY MEASURING METHOD, AND COMPUTER PROGRAM

CROSS-REFERENCE TO RELATED APPLICATIONS

This application is based upon and claims the benefit of priority of the prior Japanese Patent Application No. 2008-10709, filed on Jan. 21, 2008, the entire contents of which are incorporated herein by reference.

BACKGROUND

1. Field

The present invention relates to a communication-quality measuring apparatus capable of measuring communications quality regarding packet losses in a packet switching network by acquiring (capturing) packets transferred via a packet switching network and analyzing the acquired packets, and relates also to a communication-quality measuring method thereof, and a computer program.

2. Description of the Related Art

Conventionally, bidirectional communications via a packet switching network is possible. For example, voice telephony via the Internet is possible by transmitting and receiving packetized voice data or moving image data with voice via a packet communications network. Such voice telephony may be realized by a VoIP (Voiceover Internet Protocol), for example, and utilized as an IP telephone.

In voice communications such as an IP telephone, the voice data, in which voice is sampled at a certain rate, is transmitted and received, and thus, the amount of data to be transmitted and received is larger compared to the transmission and reception of text data. As IP telephones become widespread, the load on a network caused by voice communications tends to accumulate, and as a result, the frequency at which a packet is lost at the time of transferring the packet in a packet switching network is increased, thereby lowering communications quality of the IP telephone. Therefore, in order to quickly take action when communications quality has lowered, there have been proposed various technologies of measuring apparatuses or measuring methods concerning communications quality.

For example, there is proposed a measuring apparatus and a measuring method adapted so that a window size indicating an amount of packets to be dropped is changed according to an occurring interval of destroying the packets to adjust so that a processing capability is not exceeded (for example, Japanese Published Unexamined Patent Application No. 2000-41046), which can be put into practical application as a technology for effectively calculating a packet loss rate even in a measuring apparatus with inexpensive and low specifications.

SUMMARY

A communication-quality measuring method disclosed in the present invention acquires packets to be transferred in a packet switching network and accumulates the acquired packets in an internal buffer. An acquisition amount indicating an amount of packets acquired per given unit time, a loss amount indicating an amount of packets lost during transfer in the packet switching network, and an acquisition leak amount indicating an amount of packets that cannot be accumulated in the internal buffer out of the acquired packets are measured. Based on the measured acquisition amount, loss amount, and acquisition leak amount, a packet loss rate transferred in the packet switching network and an error for the loss rate are calculated and the calculated loss rate and the loss rate error are output.

DESCRIPTION OF THE EMBODIMENTS

In the aforementioned conventional technology, when the loss of packets is measured by using the measuring apparatus, it is not possible to distinguish from the measurement result whether the packet is lost or dropped at the time of transferring the packets in the packet switching network, or whether acquisition leaks of the packets occur due to resource depletion in a receiving device. Therefore, in the conventional technology, the confidence in the calculated packet loss rate is not sufficient, and there remains room for improvement.

The communication-quality measuring apparatus disclosed in the present invention acquires packets to be transferred in a packet switching network so as to measure an acquisition amount indicating an amount of packets acquired per given unit time, a loss amount indicating an amount of packets lost during transfer in the packet switching network, and an acquisition leak amount indicating an amount of packets that cannot be accumulated in the internal buffer out of the acquired packets. The communication-quality measuring apparatus disclosed in the present invention calculates a packet loss rate to be transferred in the packet switching network and an error for the loss rate, based on the measured acquisition amount, loss amount, and acquisition leak amount, and outputs the loss rate and the loss rate error. Thus, even in an apparatus with an inexpensive and low specification, a packet loss rate with a small error range can be output, which improves the confidence in the packet loss rate. Furthermore, the error for the loss rate is calculated, and thus, the level of confidence in the calculated loss rate can be objectively confirmed, thereby improving the confidence in the loss rate. Moreover, decreasing the ratio of the number of packets which serves as a sample for a transferred amount can be avoided, and thus, even when an apparatus with an inexpensive and low specification is used, confidence in the calculated packet loss rate can be maintained.

Figure 1:
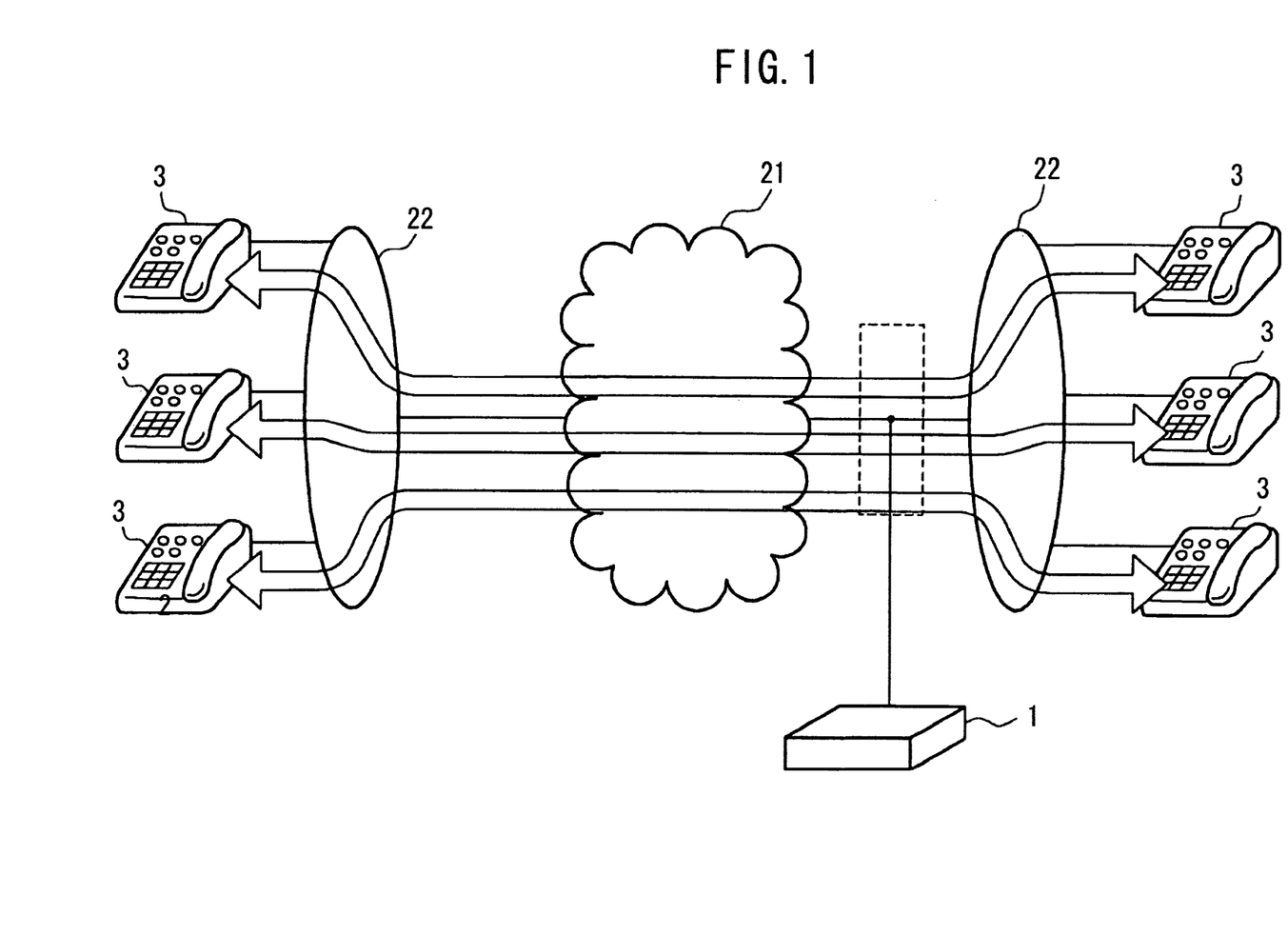
FIG. 1 is a schematic diagram showing an entire configuration of a communications system including a communication-quality measuring apparatus according to the present invention.

FIG. 1 is a schematic diagram showing a configuration of a communications system including a communication-quality measuring apparatus according to the embodiment. The embodiment is described with a communications system for performing voice communications with IP telephones as an example. However, the present invention is not limited thereto, and can also be applied to a communications system for distributing stream data, such as moving image data.

In FIG. 1, reference numeral 1 denotes a measuring apparatus. The measuring apparatus 1 corresponds to a communication-quality measuring apparatus according to the present invention. The measuring apparatus 1 is connected to a packet switching network 21 via a relay device (not shown) such as a router or a switching hub. The measuring apparatus 1 may correspond), for example, to a server device administered by a service provider (administrator. The configuration and the operation of the measuring apparatus 1 are described below.

In FIG. 1, reference numeral 3 denotes communications terminal devices each having a function of an IP telephone. Each communications terminal device 3 is connected to a communications network 22. The communications network 22 is connected to the packet switching network 21. This configuration thus allows the respective communications terminal devices 3 shown in FIG. 1 to communicate with each other via the packet switching network 21. A call connection among the respective communications terminal devices 3 shown in FIG. 1 is performed by an SIP (Session Initiation Protocol) server (not shown). The call-connected communications terminal device 3 converts voice data of a speaker input via a microphone into packets, and transmits the converted packets via the packet switching network 21 to the communications terminal device 3 of another party. The call-connected communications terminal device 3 converts packets received from the communications terminal device 3 of the other party into voice data, and outputs the converted voice data via the speaker. According to the aforementioned process, the communications terminal device 3 executes voice communications by the IP telephone function. In the aforementioned process, the packets obtained by converting the voice data are transferred using an RTP (Real-time Transport Protocol) session established by the SIP server in the packet switching network 21 (see arrows in FIG. 1).

The measuring apparatus 1 acquires the packets transferred via the packet switching network 21 so as to measure an amount of acquired packets (acquisition amount), an amount of packets lost during transfer (loss amount), and an amount of packets that cannot be accumulated in an internal buffer in the measuring apparatus 1 (acquisition leak amount). Note that together with the aforementioned measurements, other values may also be measured. The measuring apparatus 1 calculates a packet loss rate and an error thereof based on the measured values, and outputs the calculated packet loss rate and loss rate error. The packet loss rate is a ratio of an amount of packets lost during transfer in the packet switching network 21 with respect to an amount of packets transmitted from the communications terminal device 3, and serves as a level of a communications quality of the packet switching network 21. The error for the loss rate indicates an error generated by the measurement of the measuring apparatus 1, and may occur due to traffic of the packet switching network 21, transfer condition of the packets, resource depletion of the measuring apparatus 1, etc. To calculate the error of the loss rate, a conventionally well-known calculation method based on a statistical theory is used. The confidence, which may vary depending on the calculation method, for a value calculated by a calculation method having a 95% confidence interval, which is a general calculation method, is 95%. In this embodiment, it is possible to accurately measure such an error.

Figure 2:
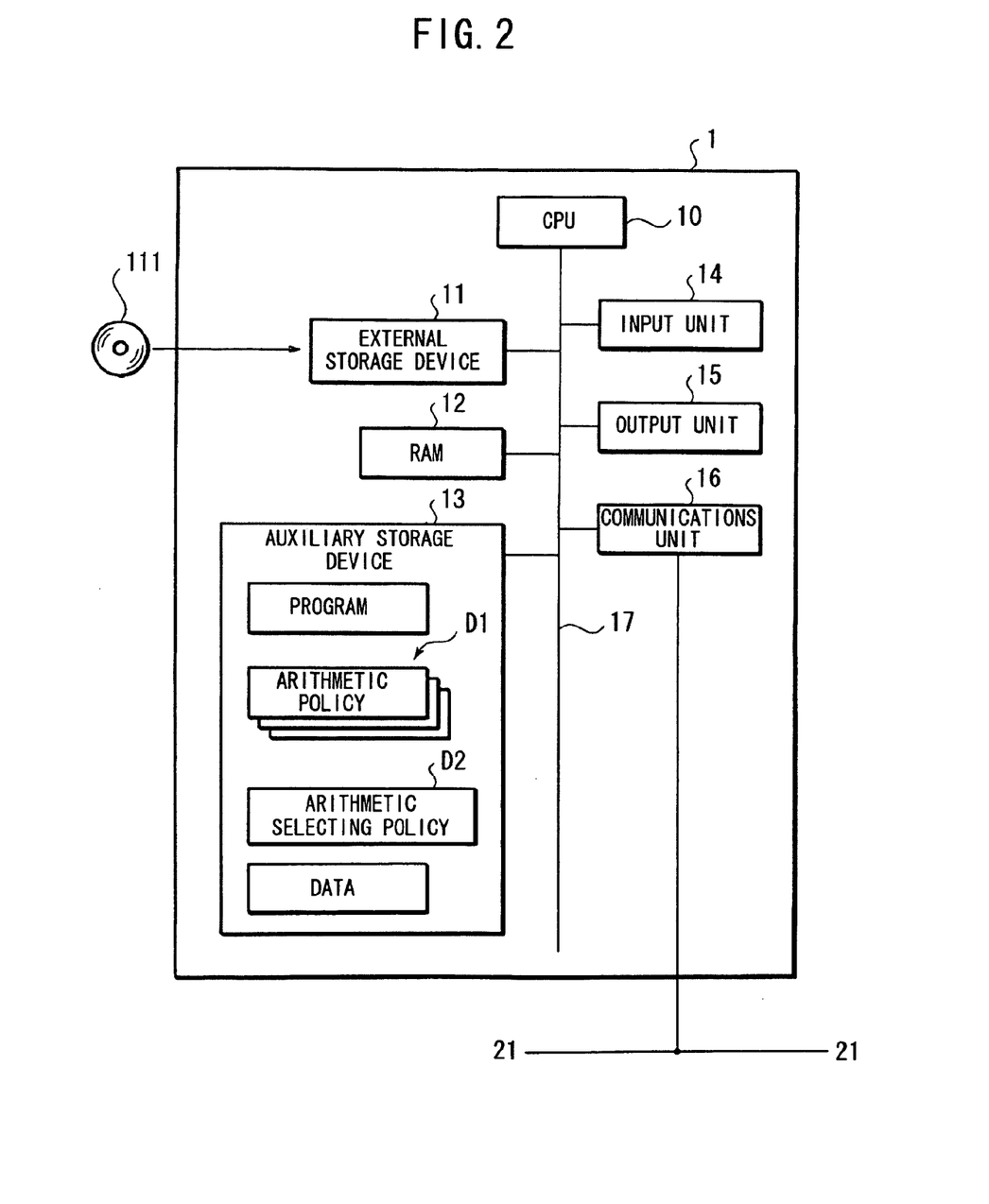
FIG. 2 is a block diagram showing the configuration of a measuring apparatus.

Next, the configuration of the measuring apparatus 1 is described. FIG. 2 is a block diagram showing the configuration of the measuring apparatus 1. The measuring apparatus 1 includes: a CPU (Central Processing Unit) 10; an external storage device 11 for reading from and writing to a recording medium 111; a RAM (Random Access Memory) 12 for storing data; an auxiliary storage device 13; an input unit 14 for inputting data; an output unit 15 for outputting data; and a communications unit 16 for acquiring packets. In FIG. 2, each hardware of the measuring apparatus 1 is connected to one another via a bus 17.

The CPU 10 reads out a program stored in the auxiliary storage device 13, and according to the read-out program, executes a process relating to control of each hardware and measurement of communications quality. The function of the CPU 10 and the procedures of a communication-quality measuring process to be executed by the CPU 10 are described later.

The external storage device 11 reads out programs, various policies, or various data that are recorded in the recording medium 111. When the recording medium 111 is inserted into an insertion slot (not shown), the external storage device 11 reads out the program, etc., recorded in the inserted recording medium 111, and outputs the read-out program, etc., to the auxiliary storage device 13.

The RAM 12 is a main storage device capable of storing a plurality of pieces of various kinds of information and reading out the information irrespective of a storage order or a storage location. The RAM 12 is controlled by the CPU 10 to store a program, an arithmetic policy D1, an arithmetic selecting policy D2, or other data read out from the auxiliary storage device 13. Furthermore, the RAM 12 stores data generated when the CPU 10 executes a program. The RAM 12 reads out the stored program, etc., as necessary, according to a reading-out instruction by the CPU 10, and outputs the read-out program, etc., to the CPU 10.

The auxiliary storage device 13 may correspond to a hard disk of a magnetic storage system, for example, and is controlled by the CPU 10 so as to store a plurality of pieces of various kinds of information. The auxiliary storage device 13 stores therein the program, the arithmetic policy D1, the arithmetic selecting policy D2, data relating to a unit time, and so on.

The program is a computer program for causing the measuring apparatus 1 to execute the communication-quality measuring method according to the embodiment.

The arithmetic policies D1 are calculation rules for calculating a packet loss rate and the error thereof based on the measured acquisition amount and loss amount of packets, etc. One or a plurality of arithmetic policies D1 may be present.

A first arithmetic policy D1, for example, may be defined as a calculation rule for causing the measuring apparatus 1 to calculate a packet loss rate to be transferred in the packet switching network 21 based on the acquisition amount of packets and the loss amount thereof measured by the measuring apparatus 1 according to the following equation (1). The first arithmetic policy D1 is a principle policy for calculating the loss rate.

[Equation 1]

$$P0 = \frac{Nloss}{Nloss + Nrecv} \quad (1)$$

In equation (1), "P0" denotes a packet loss rate, "Nloss" denotes a loss amount of packets, and "Nrecv" denotes an acquisition amount of packets. Nloss+Nrecv is estimated to be a transferred amount of packets transmitted from the communications terminal device 3.

A second arithmetic policy D1, for example, may be defined as a calculation rule for causing the measuring apparatus 1 to calculate the packet loss rate and the error thereof transferred in the packet switching network 21 based on the acquisition amount of packets and the loss amount thereof measured by the measuring apparatus 1 according to the following equations (2) to (4). The second arithmetic policy D1 is a conventionally well-known calculation method based on a statistical theory, and is called a "95% confidence interval policy".

[Equation 2]

$$P - e < P0 < P + e \qquad (2)$$

$$P = \frac{Nloss}{Nloss + Nrecv} \qquad (3)$$

$$e = 1.96\sqrt{\frac{P(1-P)}{Nloss + Nrecv}} \qquad (4)$$

In the aforementioned equations, "P0" denotes a loss rate of packets, "e" denotes an error range, "Nloss" denotes a loss amount of packets, and "Nrecv" denotes an acquisition amount of packets. Nloss+Nrecv is estimated to be the transferred amount of packets transmitted from the communications terminal device 3.

In complying with the second arithmetic policy D1, the loss rate and the error for the loss rate can be calculated. As a result, the level of confidence in the calculated loss rate can be indicated, thereby objectively confirming the confidence in the calculated loss rate.

A third arithmetic policy D1, for example, can be defined as a calculation rule for causing the measuring apparatus 1 to calculate the packet loss rate and the error thereof transferred in the packet switching network 21 based on the acquisition amount of packets, the loss amount of packets, and the acquisition leak amount measured by the measuring apparatus 1 according to the following equations (5) to (7). The third arithmetic policy D1 is a calculation method for realizing the communication-quality measuring method according to the present invention, and is called a "maximum and minimum estimating policy".

[Equation 3]

$$P\text{min} < P0 < P\text{max} \qquad (5)$$

$$P\text{min} = \frac{Nloss}{Nloss + Nrecv + Ndisc} \qquad (6)$$

$$P\text{max} = \frac{Nloss + Ndisc}{Nloss + Nrecv + Ndisc} \qquad (7)$$

In the aforementioned equations, "P0" denotes a packet loss rate, "Pmin" denotes a lower limit of the loss rate error, "Pmax" denotes an upper limit of the loss rate error, "Nloss" denotes a loss amount of packets, "Nrecv" denotes an acquisition amount of packets, and "Ndisc" denotes an acquisition leak amount of packets. Nloss+Nrecv+Ndisc is estimated to be the transferred amount of packets transmitted from the communications terminal device 3.

In complying with the third arithmetic policy D1, it is possible to calculate the packet loss rate by distinguishing acquisition leaks of packets due to resource depletion of measuring apparatus 1 from the loss of packets during transfer in the packet switching network 21. Thus, even when a large number of cases of acquisition leaks of packets due to the resource depletion of the measuring apparatus 1 occurs, the ratio of the number of packets that serves as a sample for the transferred amount is not decreased, thereby avoiding a problem of increasing the loss rate errors.

The arithmetic policies D1 are not limited to the aforementioned contents, and the packet loss rate and the error thereof may be calculated according to other contents.

Arithmetic selecting policies D2 are selection rules for causing the measuring apparatus 1 to respectively calculate the packet loss rate and the loss rate errors based on the plurality of arithmetic policies D1, D1, ..., and causing the measuring apparatus 1 to select a desirable loss rate and error thereof out of the calculated loss rates and loss rate errors. One or a plurality of arithmetic selecting policies D2 is present.

A first arithmetic selecting policy D2 may, for example, be defined as a selection rule for causing the measuring apparatus 1 to select the loss rate and the error thereof in which the calculated error is the lowest, out of the loss rates and loss rate errors respectively calculated based on the plurality of arithmetic policies D1. In complying with the first arithmetic selecting policy D2, it is possible to select the lowest loss rate error. In other words, it is possible to select the highest confidence in the calculated loss rate.

A second arithmetic selecting policy D2 may, for example, be defined as a selection rule for causing the measuring apparatus 1 to select any one of or an average value of a plurality of loss rates and loss rate errors of the arithmetic policies D1 that derive the loss rates and the loss rate errors of which the values are approximately the same, out of the loss rates and loss rate errors respectively calculated based on a plurality of arithmetic policies D1. In complying with the second arithmetic selecting policy D2, it becomes possible to select the loss rate and the loss rate error derived by a large number of arithmetic policies D1. In other words, it is possible to select the highest confidence in the calculated loss rate.

The arithmetic selecting policy D2 is not limited to the aforementioned contents, and may be defined as a selection rule for causing the measuring apparatus 1 to select the loss rate and the loss rate error calculated based on the second arithmetic policy D1 when the measured acquisition leak amount is equal to or less than a certain threshold value. Furthermore, the arithmetic selecting policy D2 can be defined as a selection rule for causing the measuring apparatus 1 to select the loss rate and the loss rate error calculated based on the third arithmetic policy D1 when the acquisition leak amount exceeds a certain threshold value. The arithmetic selecting policy D2 may also be defined as a selection rule for causing the measuring apparatus 1 to select the loss rate and the loss rate error calculated based on the first arithmetic policy D1. In complying with such an arithmetic selecting policy D2, when there is less acquisition leak of packets due to resource depletion of the measuring apparatus 1, it is possible to use a conventionally well-known calculation method based on a statistical theory; and when a calculation method of a 95% confidence interval is used, at least 95% confidence can be ensured. As another example of the arithmetic selecting policy D2, the following is possible. The arithmetic selecting policy D2 may be defined as a selection rule for causing the measuring apparatus 1 to select the loss rate and the loss rate error calculated based on the second arithmetic policy D1 when the measured loss amount exceeds a certain threshold value. The arithmetic selecting policy D2 may be defined as a selection rule for causing the measuring apparatus 1 to select the loss rate and the loss rate error calculated based on the third arithmetic policy D1 when the measured loss amount is equal to or less than a certain threshold value. The arithmetic selecting policy D2 may also be defined as a selection rule for causing the measuring apparatus 1 to select the loss rate and the loss rate error calculated based on the first arithmetic policy D1. When the number of packets that serves as a sample for the transferred amount can be ensured to a certain degree by complying with such an arithmetic selecting policy D2, it becomes possible to use a conventionally well-known calculation method based on the statistical theory thereby to ensure at least 95% confidence. Thus, the arithmetic selecting policy D2 is regulated by the contents by which the optimal loss rate and the loss rate error may be selected.

The input unit 14 is provided with a plurality of operation buttons and so on. The input unit 14 is controlled by the CPU 10 to accept various data and various instructions, input by the administrator, for the communication-quality measuring process, and outputs the accepted various data and various instructions to the CPU 10, the RAM 12, and/or the auxiliary storage device 13.

The output unit 15 corresponds to a display device, a speaker, and/or an output interface to an external device. The output unit 15 is controlled by the CPU 10 to accept various data and various instructions for the communication-quality measuring process, from the CPU 10, the RAM 12, and/or the auxiliary storage device 13. The output unit 15 outputs the accepted various data and various instructions for the communication-quality measuring process by way of images or voice, or outputs the same to the external device. The external device used herein may be), for example, a log-file recording device (not shown. The external device records various data for the communication-quality measuring process, and reads out the recorded various data in response to a reading-out request, as necessary.

The communications unit 16 may be connected to an RTP session connected between the packet switching network 21 and the respective communications networks 22. The communications unit 16 is controlled by the CPU 10 to acquire packets to be transferred in the RTP session, and output the acquired packets to the RAM 12.

Figure 3:
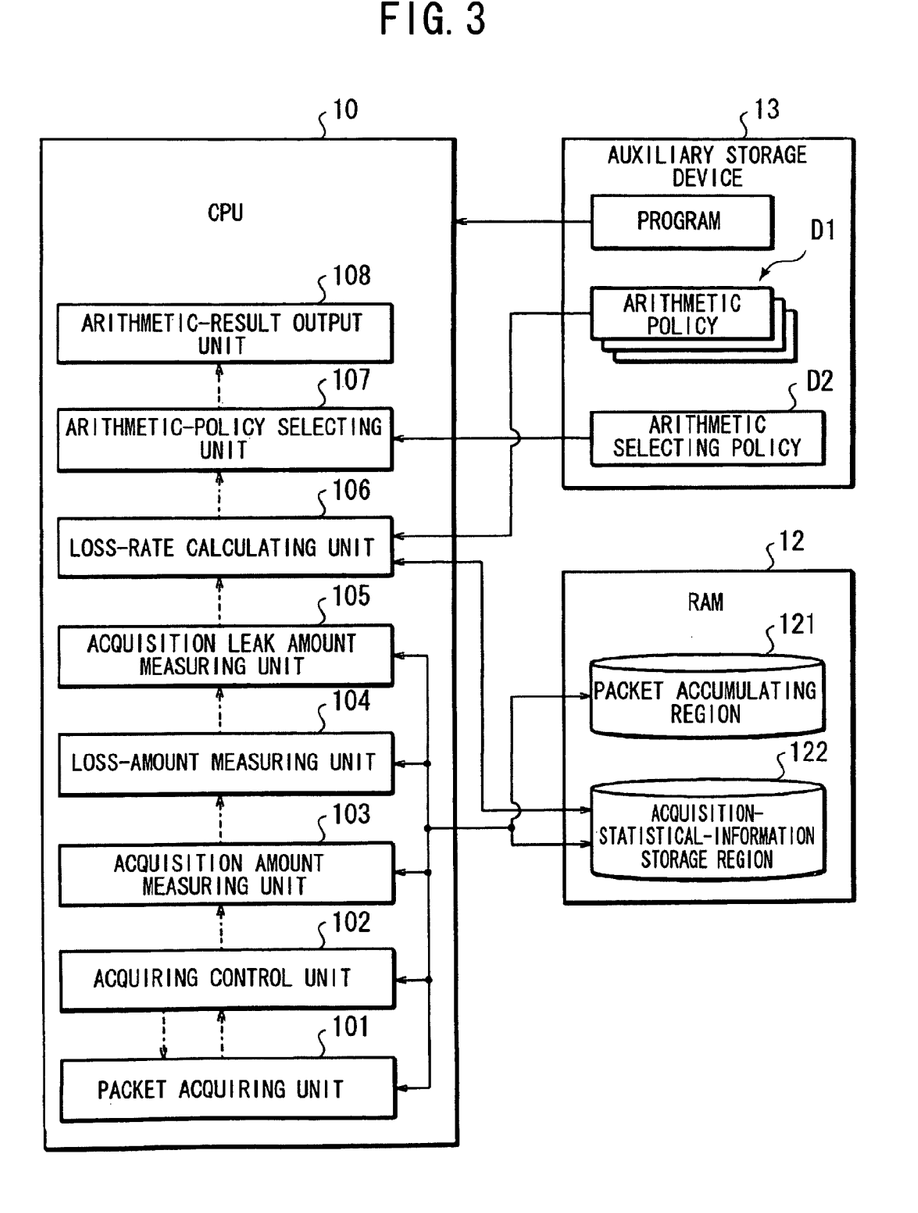
FIG. 3 is a block diagram showing the functions of a CPU.
Figure 4:
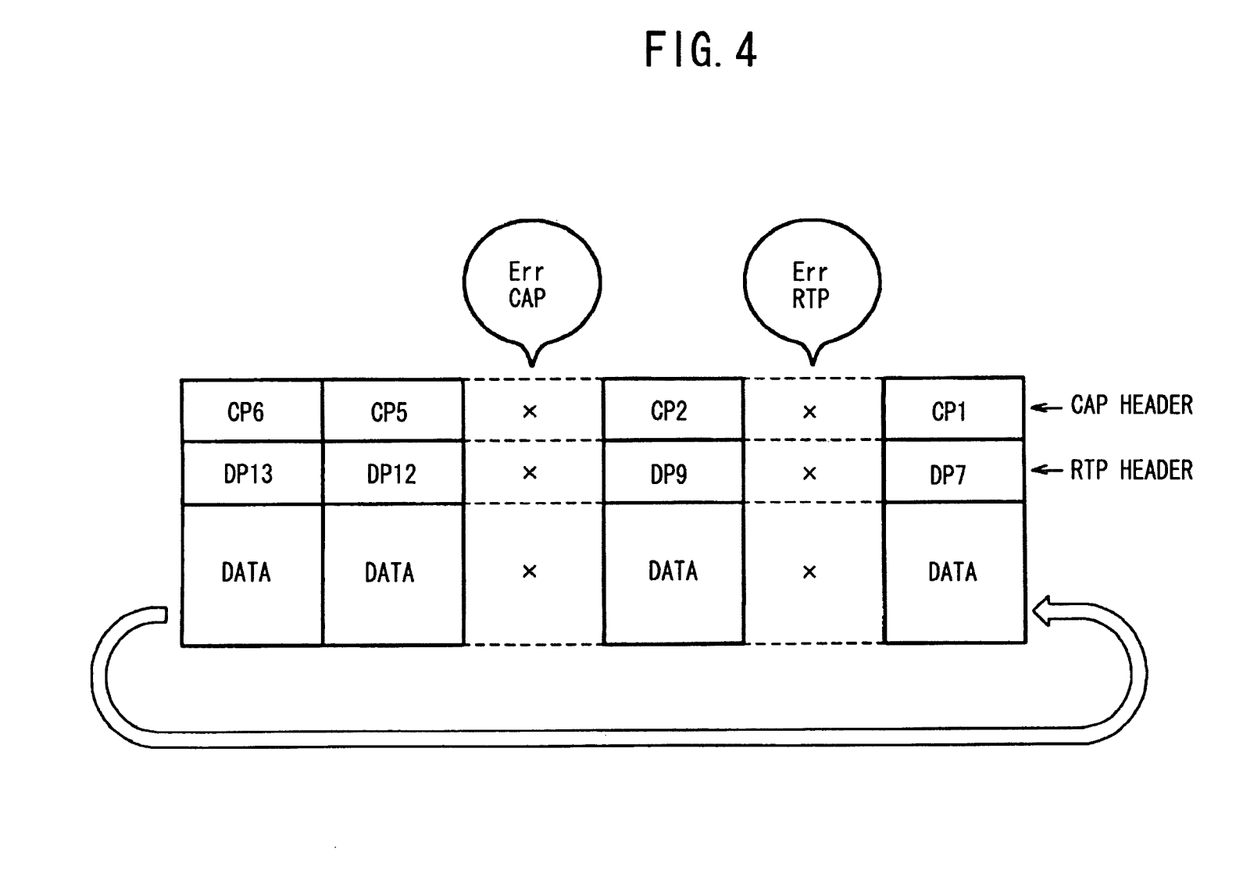
FIG. 4 is a schematic diagram showing a storage example of an acquired packet.
Figure 5:
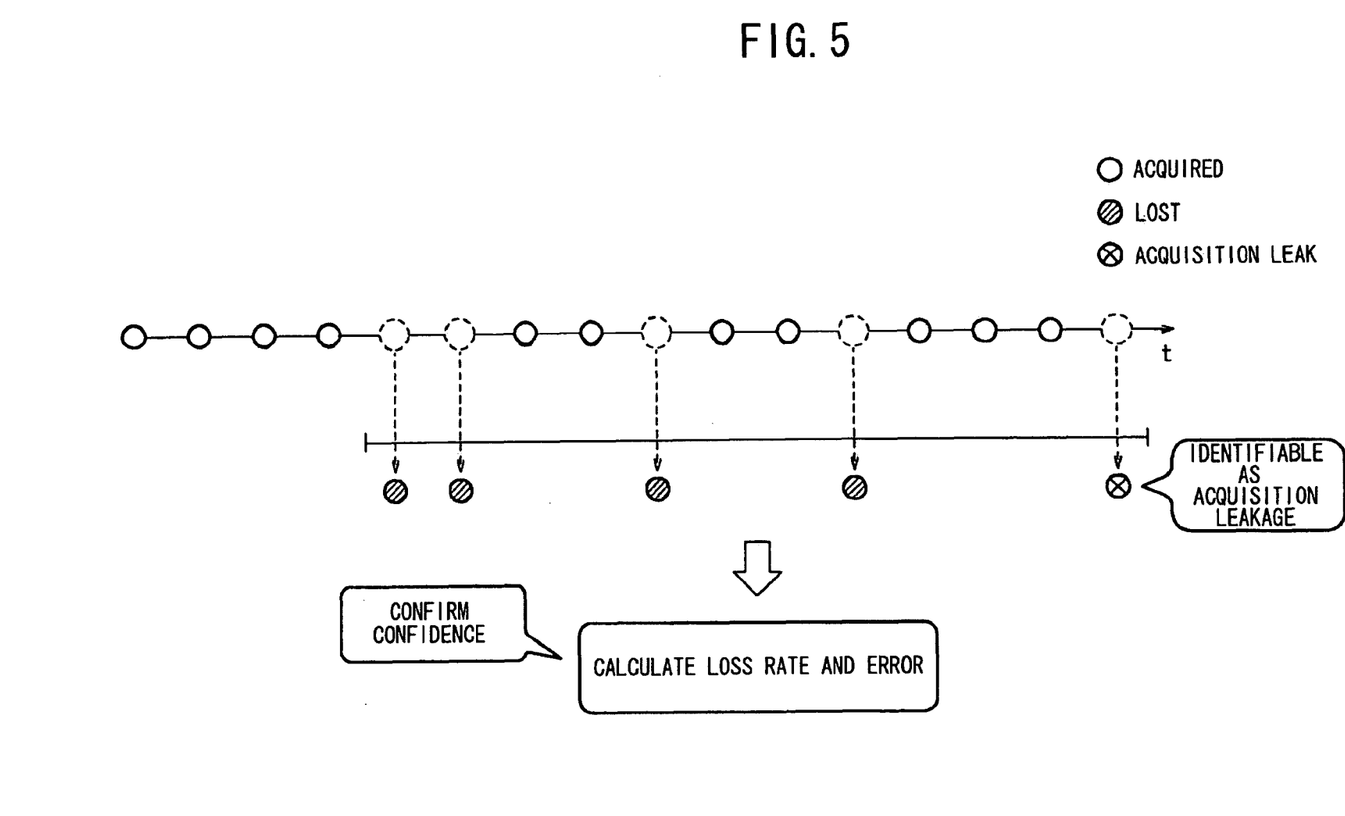
FIG. 5 is a diagram describing a relationship between an acquisition amount of packets, a loss amount thereof, and an acquisition leak amount thereof.

Next, the function of the CPU 10 according to the first embodiment is described. FIG. 3 shows the function of the CPU 10. FIG. 4 shows an example in which the acquired packets are stored. FIG. 5 shows a relationship among the acquisition amount, loss amount, and acquisition leak amount of packets. The CPU 10 complies with the program stored in the auxiliary storage device 13 so as to function as packet acquiring unit 101 for acquiring packets; acquiring control unit 102 for controlling the acquisition of the packets by the packet acquiring unit 101; acquisition amount measuring unit 103 for measuring an acquisition amount; loss-amount measuring unit 104 for measuring a loss amount; acquisition leak amount measuring unit 105 for measuring an acquisition leak amount; loss-rate calculating unit 106 for calculating a loss rate; arithmetic-policy selecting unit 107 for selecting an arithmetic policy to be utilized; and arithmetic-result output unit 108 for outputting an arithmetic result.

When functioning as the packet acquiring unit 101, the CPU 10 successively acquires packets transferred in the RTP session via the communications unit 16, and applies a CAP header to each of the acquired packets. The CAP header stores an acquisition number indicating an order of acquiring times.

The CPU 10 accumulates the packets each including a CAP header in a packet accumulating region 121 of the RAM 12. The packet accumulating region 121 is a fixed-length buffer. The CPU 10 performs ring buffering on the accumulated packets (see FIG. 4). That is, the CPU 10 arranges the packets in the order of the acquisition number and stores the packets in the packet accumulating region 121 like a ring buffer. The CPU 10 uses, as a head packet, a packet with the newest acquisition number, and performs a process on the head packet. After completion of the process on the head packet, the CPU 10 overwrites the head packet with a new packet, and uses a packet with the second newest acquisition number as a new head packet. The overwritten packet becomes the rearmost packet. The CPU 10 performs a similar process on the new head packet. When the packet acquiring unit 101 acquires packets but cannot perform ring-buffering in the packet accumulating region 121, acquisition leaks of packets occurs. In this case, in the packet accumulating region 121, the acquisition numbers of the CAP header become discontinuous.

When functioning as the acquiring control unit 102, the CPU 10 controls acquisition of packets by the packet acquiring unit 101, and performs various measurements on the packets acquired per given unit time. The CPU 10 that functions as the acquiring control unit 102 counts a unit time. Data concerning a unit time may be set and stored in the auxiliary storage device 13, and may be updated by the administrator.

When functioning as the acquisition amount measuring unit 103, the CPU 10 sequentially reads out the packets accumulated in the packet accumulating region 121 of the RAM 12, and extracts a transfer number stored in an RTP header of each of the read-out packets. The RTP header is assigned to the packet each time the communications terminal device 3 or transmission source transmits the packet. The transfer number is a sequence number indicating a transfer order. The CPU 10 counts the number of transfer numbers to measure the number of packets (acquisition amount) acquired per given unit time. The CPU 10 stores the measured acquisition amount in an acquisition-statistical-information storage region 122 of the RAM 12.

When functioning as the loss-amount measuring unit 104, the CPU 10 sequentially reads out the packets accumulated in the packet accumulating region 121 of the RAM 12, and extracts the transfer numbers stored in the RTP headers and the acquisition numbers stored in the CAP headers of the read-out packets. The CPU 10 analyzes the arrangement of the extracted transfer numbers and acquisition numbers so as to detect a position where the continuity of only the transfer number of the adjacent packets is broken as a position where only the transfer number is missing. When detecting the position where only the transfer number is missing, the CPU 10 records a loss marker ErrRTP in the missing position. The CPU 10 counts the number of loss markers ErrRTP so as to measure the number of packets lost during transfer (loss amount) out of the packets acquired per given unit time. The CPU 10 stores the measured loss amount in the acquisition-statistical-information storage region 122 of the RAM 12.

When functioning as the acquisition leak-amount measuring unit 105, the CPU 10 sequentially reads out the packets accumulated in the packet accumulating region 121 of the RAM 12, and extracts the acquisition numbers stored in the CAP headers of the read-out packets. The CPU 10 analyzes the arrangement of the extracted acquisition numbers and detects a position where the continuity of the acquisition numbers of the adjacent packets is broken as a position where an acquisition number is missing. When detecting the position where an acquisition number is missing, the CPU 10 records an acquisition leak marker ErrCAP in the missing position. The CPU 10 counts the number of acquisition leak markers ErrCAP so as to count the number of packets (acquisition leak amount) that cannot be accumulated within the apparatus out of the packets acquired per given unit time. The CPU 10 stores the counted acquisition leak amount in the acquisition-statistical-information storage region 122 of the RAM 12.

When functioning as the loss-rate calculating unit 106, the CPU 10 reads out one or plurality of arithmetic policies D1 stored in the auxiliary storage device 13, and reads out the acquisition amount, the loss amount and/or the acquisition leak amount that are stored in the acquisition-statistical-information storage region 122 of the RAM 12. The CPU 10 calculates a packet loss rate and the error thereof based on the read-out acquisition amount, loss amount, and/or acquisition leak amount according to the arithmetic policy D1. The CPU 10 associates the calculated loss rate with the error thereof and stores them in the acquisition-statistical-information storage region 122 of the RAM 12.

When respectively calculating the loss rates and the loss rate errors according to the plurality of arithmetic policies D1 in the loss-rate calculating unit 106, the CPU 10 functions as the arithmetic-policy selecting unit 107. When functioning as the arithmetic-policy selecting unit 107, the CPU 10 reads out the arithmetic selecting policy D2 stored in the auxiliary storage device 13, and reads out the plurality of loss rates and loss rate errors that are stored in the acquisition-statistical-information storage region 122 of the RAM 12. The CPU 10 selects the optimal loss rate and loss rate error out of the read-out loss rates and loss rate errors according to the arithmetic selecting policy D2.

The CPU 10 functions as the arithmetic-result output unit 108. The CPU 10 outputs information concerning the loss rate and the loss rate error calculated in the loss-rate calculating unit 106 or information concerning the loss rate and loss rate error selected by the arithmetic-policy selecting unit 107 by way of images (or voice, text) via the output unit 15, or outputs the same to an external device (such as a display device). The information to be output used herein may be, for example, the information of the RTP header of the analyzed packet, and the measured acquisition amount, loss amount, acquisition leak amount, loss rate, and/or loss rate error.

Next, the procedure of the communication-quality measuring process executed by the measuring apparatus 1 according to the computer program of the present invention is divided into first to third embodiments, and these embodiments are respectively described. The procedure of the communication-quality measuring process executed by the measuring apparatus 1 corresponds to a communication-quality measuring method according to the present invention.

Embodiment 1

Figure 6:
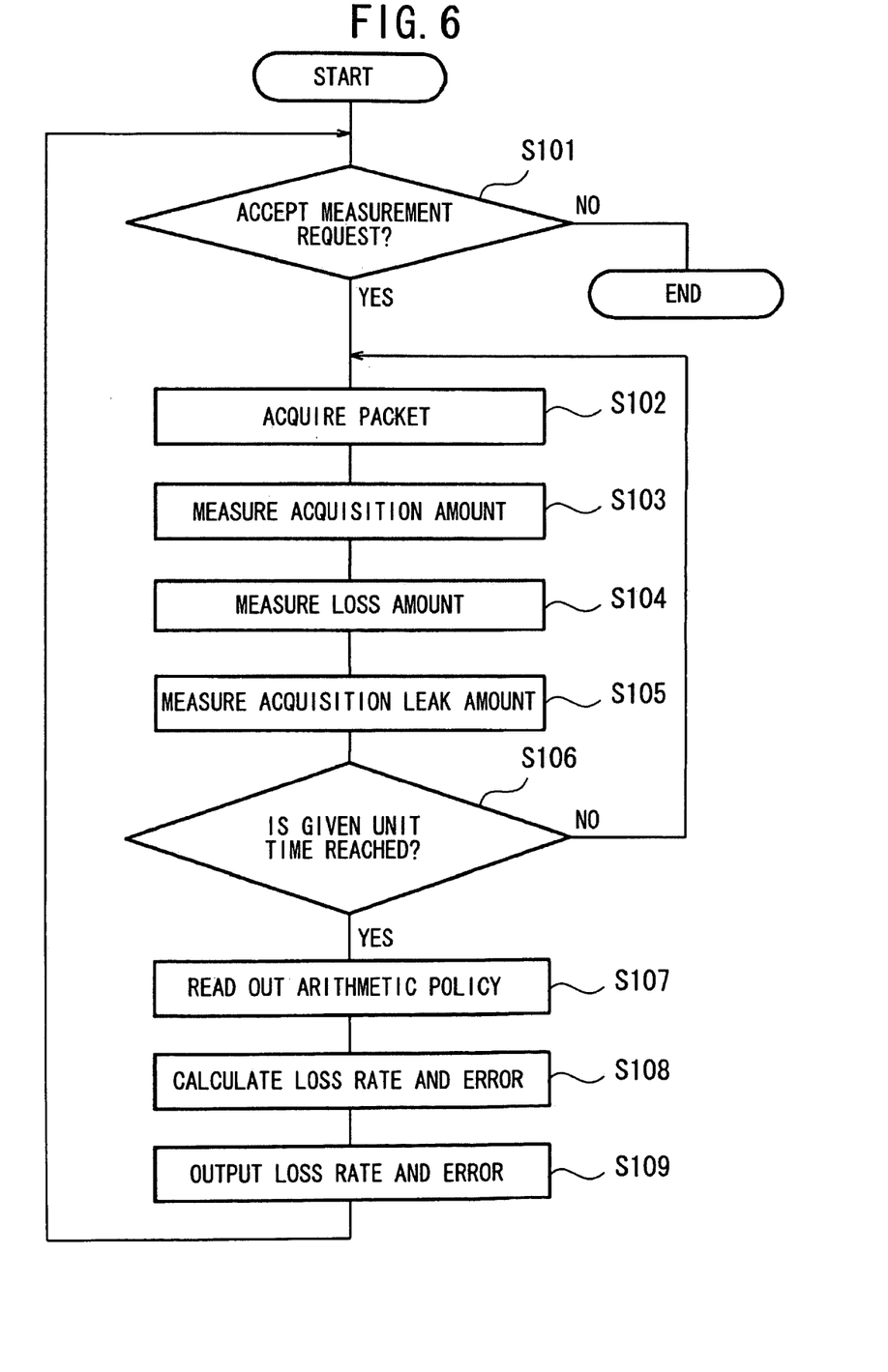
FIG. 6 is a flow chart showing a procedure of a communication-quality measuring process according to a first embodiment.

In the embodiment 1, one example in which the measuring apparatus 1 complies with one arithmetic policy D1 to calculate the packet loss rate and the error thereof based on the acquisition amount, the loss amount, and the acquisition leak amount of the measured packets, and outputs the calculated loss rate and loss rate error is described. FIG. 6 is a flow chart showing the procedure of the communication-quality measuring process according to embodiment 1. Herein, embodiment 1 is described with the arithmetic policy D1 as the aforementioned third arithmetic policy D1.

The administrator inputs a measurement request via the input unit 14 of the measuring apparatus 1 in order to measure communications quality. The CPU 10 of the measuring apparatus 1 determines whether or not the measurement request input by the administrator is accepted (S11). When the CPU 10 determines that the measurement request is not accepted (at S101, NO), the CPU 10 does not execute the communication-quality measuring process.

On the other hand, when the CPU 10 determines that the measurement request is accepted (at S101, YES), the CPU 10 acquires the packets to be transferred in the RTP session via the communications unit 16 (S102). The CPU 10 assigns a CAP header to a packet each time a packet is acquired, and accumulates the packets including the CAP headers in the packet accumulating region 121 of the RAM 12.

The CPU 10 sequentially reads out the packets accumulated in the packet accumulating region 121 of the RAM 12, and analyzes the RTP headers of the read-out packets to measure the acquisition amount of the packets (S103). The CPU 10 stores the measured acquisition amount in the acquisition-statistical-information storage region 122 of the RAM 12.

The CPU 10 analyzes the RTP headers and the CAP headers of the read-out packets to measure the loss amount of the packets (S104). The CPU 10 stores the measured loss amount in the acquisition-statistical-information storage region 122 of the RAM 12.

The CPU 10 analyzes the RTP headers and the CAP headers of the read-out packets to measure the acquisition leak amount of the packets (S105). The CPU 10 stores the measured acquisition leak amount in the acquisition-statistical-information storage region 122 of the RAM 12.

The CPU 10 reads out the data relating to a unit time stored in the auxiliary storage device 13 to determine whether or not an execution time from the steps S102 to S105 reaches a given unit time (S106). As a result, when determining that the execution time does not reach the given unit time (at S106, NO), the CPU 10 returns to step S102 to repeat the communication-quality measuring process.

On the other hand, when determining that the execution time reaches the given unit time (at S106, YES), the CPU 10 reads out the arithmetic policy D1 stored in the auxiliary storage device 13 (S107). The CPU 10 reads out the acquisition amount, the loss amount, and the acquisition leak amount stored in the acquisition-statistical-information storage region 122 of the RAM 12, and complies with the arithmetic policy D1 to calculate the packet loss rate and the loss rate error based on the read-out acquisition amount, loss amount, and acquisition leak amount (S108).

The CPU 10 outputs the calculated packet loss rate and error thereof via the output unit 15 (S109). The CPU 10 returns to step S101 to determine whether or not the CPU 10 is in a state of accepting the measurement request (S101), and when determining that accepting of the measurement request is ended (at S101, NO), the CPU 10 completes the communication-quality measuring process.

On the other hand, when the CPU 10 determines that it is in a state of accepting the measurement request (at S101, YES), the CPU 10 repeats the processes of step S102 and thereafter.

Figure 7:
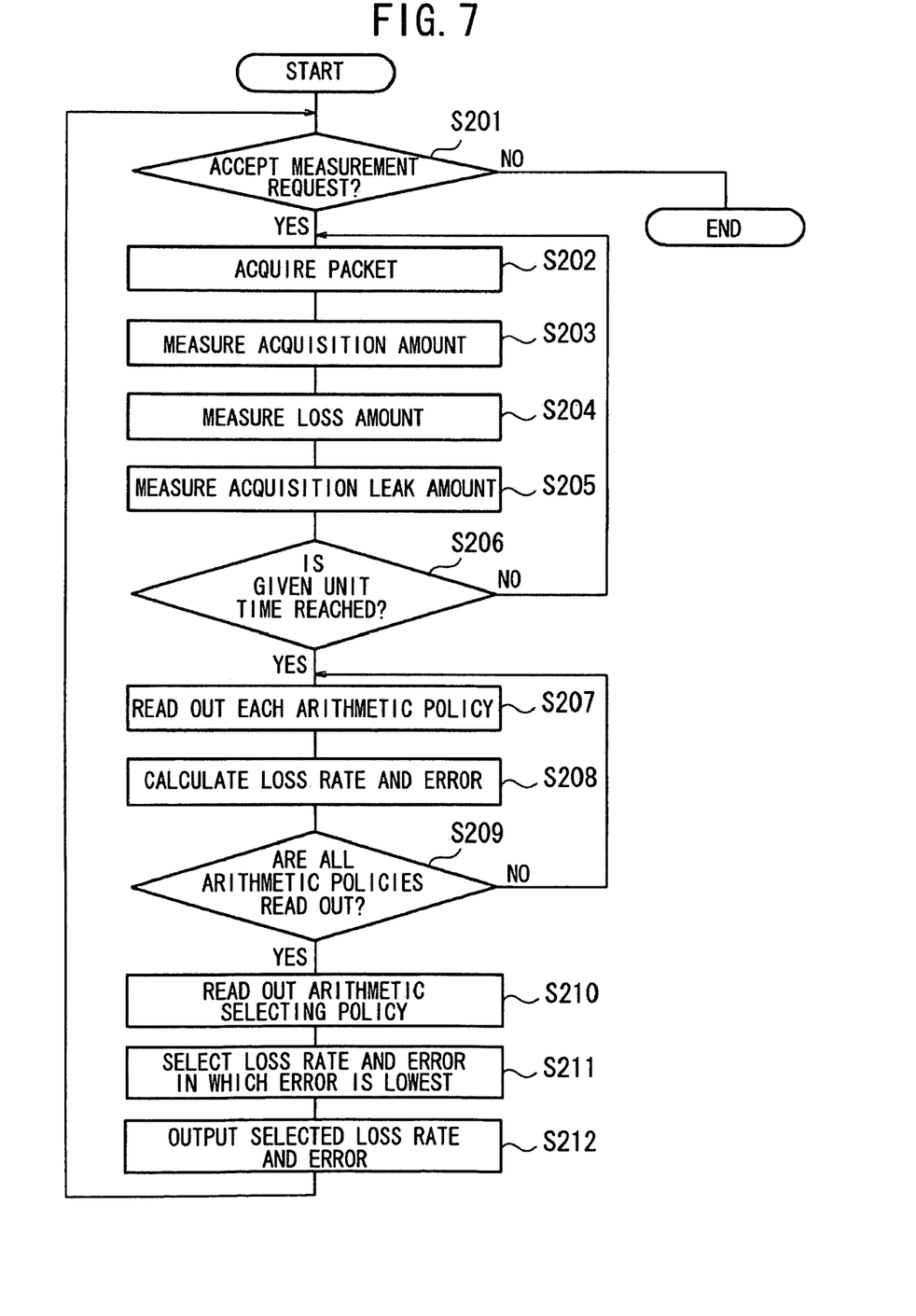
FIG. 7 is a flow chart showing a procedure of the communication-quality measuring process according to a second embodiment.

In the aforementioned embodiment 1, one example of the communication-quality measuring method in which the measuring apparatus 1 complies with one arithmetic policy D1 to calculate the packet loss rate and the loss rate error based on the acquisition amount, the loss amount, and the acquisition leak amount of the measured packet is described. However, the present invention is not limited thereto. For example, it may be possible that to comply with a plurality of arithmetic policies D1, the measuring apparatus 1 respectively calculates the packet loss rates and loss rate errors, and from the calculated packet loss rates and loss rate errors, the measuring apparatus 1 selects the loss rate and the loss rate error in which errors are the lowest, and then outputs the selected loss rate and loss rate error. Therefore, in embodiment 2, one example of such a communication-quality measuring method is described. FIG. 7 is a flow chart showing the procedure of the communication-quality measuring process according to embodiment 2. Here, embodiment 2 is described with a plurality of arithmetic policies D1 as the aforementioned first, second, third, and other arithmetic policies D1, and the arithmetic selecting policy D2 is the aforementioned first arithmetic selecting policy D2.

The administrator inputs a measurement request via the input unit 14 of the measuring apparatus 1 in order to measure the communications quality. The CPU 10 of the measuring apparatus 1 determines whether or not the measurement request input by the administrator is accepted (S201), and when determining that the measurement request is not accepted (at S201, NO), the CPU 10 does not execute the communication-quality measuring process.

On the other hand, when determining that the measurement request is accepted (at S201, YES), the CPU 10 acquires the packet to be transferred in the RTP session via the communications unit 16 (S202). The CPU 10 assigns a CAP header to a packet each time a packet is acquired, and accumulates the packets including the CAP header in the packet accumulating region 121 of the RAM 12.

The CPU 10 sequentially reads out the packets accumulated in the packet accumulating region 121 of the RAM 12, and analyzes the RTP headers of the read-out packets to measure the acquisition amount of the packets (S203). The CPU 10 stores the measured acquisition amount in the acquisition-statistical-information storage region 122 of the RAM 12.

The CPU 10 analyzes the RTP headers and the CAP headers of the read-out packets to measure the loss amount of the packets (S204). The CPU 10 stores the measured loss amount in the acquisition-statistical-information storage region 122 of the RAM 12.

The CPU 10 analyzes the RTP headers and the CAP headers of the read-out packets to measure the acquisition leak amount of the packets (S205). The CPU 10 stores the measured acquisition leak amount in the acquisition-statistical-information storage region 122 of the RAM 12.

The CPU 10 reads out the data relating to a unit time stored in the auxiliary storage device 13 to determine whether or not an execution time from the steps S202 to S205 reaches a given unit time (S206). As a result, when determining that the execution time does not reach the given unit time (at S206, NO), the CPU 10 returns to step S202 to repeat the communication-quality measuring process.

On the other hand, when determining that the execution time reaches the given unit time (at S206, YES), the CPU 10 reads out each arithmetic policy D1 stored in the auxiliary storage device 13 (S207). The CPU 10 reads out the acquisition amount, loss amount, and/or acquisition leak amount stored in the acquisition-statistical-information storage region 122 of the RAM 12, and complies with the arithmetic policy D1 to calculate the packet loss rate and the loss rate error based on a combination of either the read-out acquisition amount, loss amount, and/or acquisition leak amount (S208). The CPU 10 stores the calculated loss rate and loss rate error in the acquisition-statistical-information storage region 122 of the RAM 12.

The CPU 10 determines whether or not all the arithmetic policies D1 stored in the auxiliary storage device 13 are read out (S209), and when determining that all the arithmetic policies D1 stored in the auxiliary storage device 13 are not read out (at S209, NO), the CPU 10 complies with any one of the arithmetic policies D1 and returns to step S207, since the calculation is not performed, to repeat the communication-quality measuring process.

On the other hand, when determining that all the arithmetic policies D1 stored in the auxiliary storage device 13 are read out (at S209, YES), the CPU 10 reads out the arithmetic selecting policy D2 stored in the auxiliary storage device 13 (S210) to read out a plurality of loss rates and loss rate errors stored in the acquisition-statistical-information storage region 122 of the RAM 12. The CPU 10 complies with the arithmetic selecting policy D2 to compare the read-out loss rate errors so as to select the loss rate and the loss rate error in which the error is the lowest (S211).

The CPU 10 outputs the selected loss rate and loss rate error via the output unit 15 (S212). The CPU 10 returns to step S201 to determine whether or not the measurement request is in an accepted state (S201), and when determining that accepting of the measurement request is ended (at S201, NO), the CPU 10 completes the communication-quality measuring process.

On the other hand, when determining that the measurement request is in an accepted state (at S201, YES), the CPU 10 repeats the processes at step S202 and thereafter.

Thus, in the present invention, even in the conventionally well-known calculating method based on the statistical theory, a loss rate in which the loss rate error is the lowest, i.e., a loss rate with high confidence, can be selected and output, without being limited to the calculating methods according to the present invention.

Embodiment 3

Figure 8:
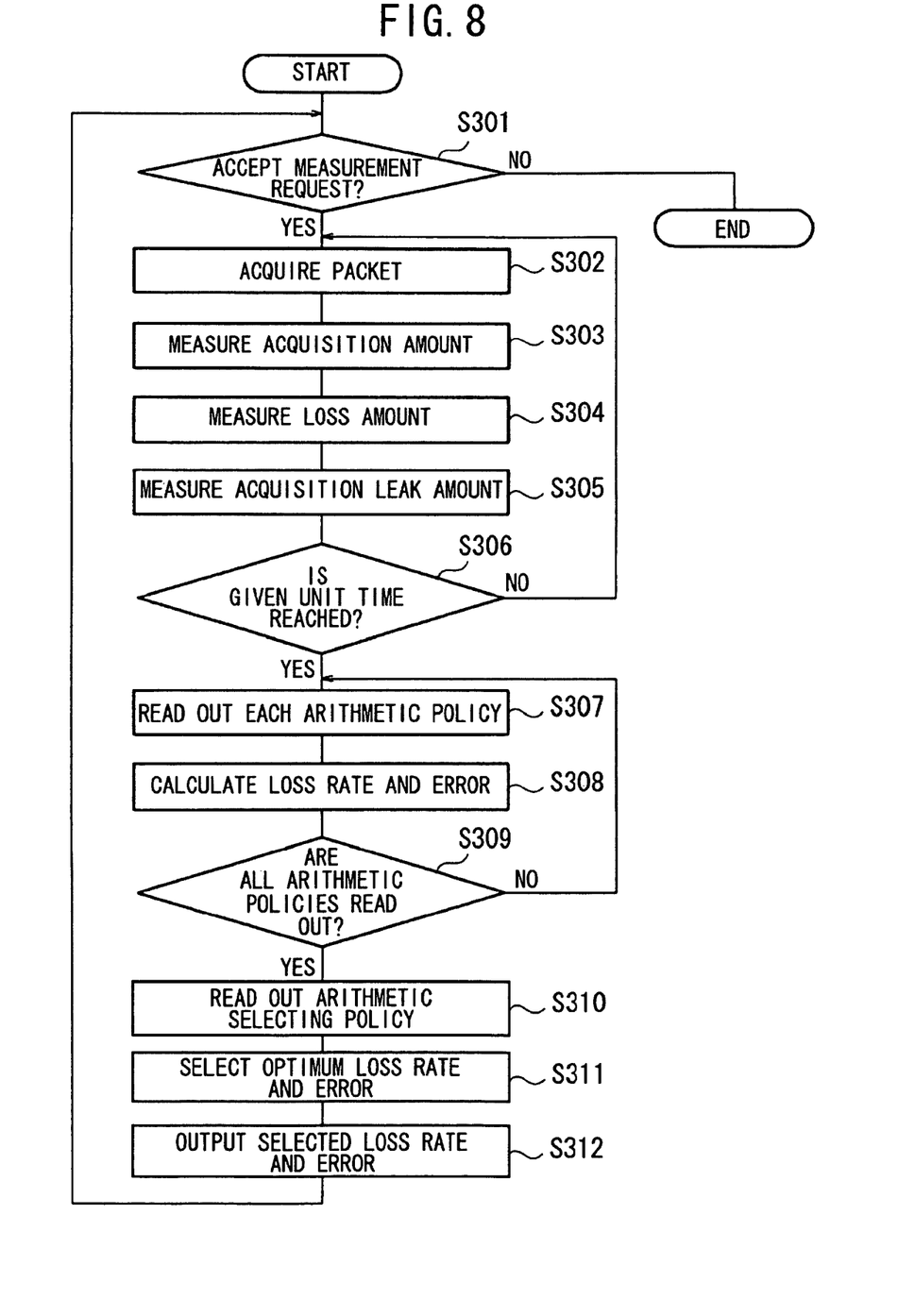
FIG. 8 is a flow chart showing a procedure of the communication-quality measuring process according to a third embodiment.

In the aforementioned embodiment 2, one example in which the measuring apparatus 1 complies with a plurality of arithmetic policies D1 to calculate the packet loss rate and the loss rate error, respectively, and from the calculated packet loss rate and loss rate error, the loss rate and the loss rate error in which the error is lowest are selected, and the selected loss rate and loss rate error are output is described. However, the present invention is not limited thereto, and the optimal loss rate and loss rate error may be selected and output according to a previously set selecting policy D1 from the packet loss rate and the loss rate error that are respectively calculated. Therefore, in embodiment 3, one example of such a communication-quality measuring method is described. FIG. 8 is a flow chart showing the procedure of the communication-quality measuring process according to embodiment 3. Embodiment 3 is described with a plurality of arithmetic policies D1 as the aforementioned first, second, third, and other arithmetic policies, and the arithmetic selecting policy D2 is the aforementioned second or other arithmetic selecting policy D2.

The administrator inputs a measurement request via the input unit 14 of the measuring apparatus 1 in order to measure the communications quality. The CPU 10 of the measuring apparatus 1 determines whether or not the measurement request input by the administrator is accepted (S301), and when determining that the measurement request is not accepted (at S301, NO), the CPU 10 does not execute the communication-quality measuring process.

On the other hand, when determining that the measurement request is accepted (at S301, YES), the CPU 10 acquires the packets to be transferred in the RTP session via the communications unit 16 (S302). The CPU 10 assigns a CAP header to a packet each time a packet is acquired, and accumulates the packets including the CAP headers in the packet accumulating region 121 of the RAM 12.

The CPU 10 sequentially reads out the packets accumulated in the packet accumulating region 121 of the RAM 12, and analyzes the RTP headers of the read-out packets to measure the acquisition amount of the packets (S303). The CPU 10 stores the measured acquisition amount in the acquisition-statistical-information storage region 122 of the RAM 12.

The CPU 10 analyzes the RTP headers and the CAP headers of the read-out packets to measure the loss amount of the packets (S304). The CPU 10 stores the measured loss amount in the acquisition-statistical-information storage region 122 of the RAM 12.

The CPU 10 analyzes the RTP headers and the CAP headers of the read-out packets to measure the acquisition leak amount of the packets (S305). The CPU 10 stores the measured acquisition leak amount in the acquisition-statistical-information storage region 122 of the RAM 12.

The CPU 10 reads out the data relating to a unit time stored in the auxiliary storage device 13 to determine whether or not an execution time from the steps S302 to S305 reaches a given unit time (S306). When determining that the execution time does not reach the given unit time (at S306, NO), the CPU 10 returns to step S302 to repeat the communication-quality measuring process.

On the other hand, when determining that the execution time reaches the given unit time (at S306, YES), the CPU 10 reads out each arithmetic policy D1 stored in the auxiliary storage device 13 (S307). The CPU 10 reads out the acquisition amount, the loss amount, and/or the acquisition leak amount stored in the acquisition-statistical-information storage region 122 of the RAM 12, and complies with the arithmetic policy D1 to calculate the packet loss rate and the loss rate error based on a combination of the read-out acquisition amount, loss amount, and/or acquisition leak amount (S308). The CPU 10 stores the calculated loss rate and loss rate error in the acquisition-statistical-information storage region 122 of the RAM 12.

The CPU 10 determines whether or not all the arithmetic policies D1 stored in the auxiliary storage device 13 are read out (S309). When determining that all the arithmetic policies D1 stored in the auxiliary storage device 13 are not read out (at S309, NO), the CPU 10 returns to step S307, since the calculation according to any one of the arithmetic policies D1 is not performed, to repeat the communication-quality measuring process.

On the other hand, when determining that all the arithmetic policies D1 stored in the auxiliary storage device 13 are read out (at S309, YES), the CPU 10 reads out the arithmetic selecting policy D2 stored in the auxiliary storage device 13 (S310) to read out a plurality of loss rates and loss rate errors stored in the acquisition-statistical-information storage region 122 of the RAM 12. The CPU 10 complies with the arithmetic selecting policy D2 to select the optimal loss rate and loss rate error (S311).

The CPU 10 outputs the selected loss rate and loss rate error via the output unit 15 (S312). The CPU 10 returns to step S301 to determine whether or not it is in a state of accepting the measurement request (S301). When determining that accepting of the measurement request is ended (at S301, NO), the CPU 10 completes the communication-quality measuring process. That is, when accepting an instruction of stopping the measurement input by the administrator, the CPU 10 completes the communication-quality measuring process.

On the other hand, when determining that the CPU 10 is in a state of accepting the measurement request (at S301, YES), the CPU 10 repeats the processes at step S302 and thereafter.

Thus, in the present invention, even in the conventionally well-known calculating method based on the statistical theory, the optimal loss rate, i.e., a loss rate with high confidence, can be selected and output, without being limited to the calculating method according to the present invention.

Thus, the procedure of the communication-quality measuring process executed by the measuring apparatus 1 is described in the first to third embodiments. Next, the selection of the arithmetic policy in the communication-quality measuring process according to embodiment 2 is described based on specific numerical values.

Provided that the CPU 10 of the measuring apparatus 1 measures 45 Nrecvs, which is the number of packets already acquired per given unit time, four Nlosses, which is the number of lost packets, and one Ndisc, which is the number of acquisition leak packets, the CPU 10 reads out the aforementioned second arithmetic policy D1 from the auxiliary storage device 13. The CPU 10 complies with the second arithmetic policy D1 to calculate the loss rate and the loss rate error. The result is that the loss rate and the loss rate error become P−e<P0<P+e, i.e., 0.50<P0<15.83 (where P−e denotes a minimum error, P+e denotes a maximum error, and P0 denotes a loss rate). The CPU 10 reads out the aforementioned third arithmetic policy D1 from the auxiliary storage device 13. The CPU 10 complies with the third arithmetic policy D1 to calculate the loss rate and the loss rate error. The result is that the loss rate and the loss rate error become Pmin<P0<Pmax, i.e., 8.00<P0<10.00 (where Pmin denotes a minimum error, Pmax denotes a maximum error, and P0 denotes a loss rate). The CPU 10 reads out the aforementioned first arithmetic selecting policy D2 from the auxiliary storage device 13. The CPU 10 complies with the first arithmetic selecting policy D2 to select the loss rate and the loss rate error in which the error is the lowest. The result is that the CPU 10 selects Pmin<P0<Pmax=8.00<P0<10.00, i.e., the loss rate and loss rate error calculated based on the third arithmetic policy D1.

The aforementioned embodiments are described with the measuring apparatus 1 as a server device administered by the administrator. However, the present invention is not limited thereto, and the measuring apparatus 1 may be downsized so as to be incorporated in the communications terminal device 3. In such a case, the communications terminal device 3 converts the packets acquired by the packet acquiring unit 101 into voice data and outputs the same, and converts voice data of a speaker into packets and outputs the same to the packet switching network 21.

What is claimed is:

1. A communication-quality measuring apparatus, comprising:
a a processor, which is coupled to a packet switching network, the processor configured to execute;
an acquiring process for acquiring, from the packet switching network, a packet transferred in the packet switching network, and for assigning a sequential number to the acquired packet in an acquired order;
an accumulating process for accumulating the acquired packet;
an analyzing process for analyzing the acquired packet;
a measuring process for measuring an acquisition amount indicating an amount of packets acquired by the acquiring process per given unit time, a loss amount indicating an amount of packets lost during a transfer in the packet switching network, and an acquisition leak amount indicating an amount of packets out of the acquired packets that cannot be accumulated into the accumulating process, wherein the acquisition leak amount is obtained by detecting a skipped sequential number among the sequential number assigned to the acquired packet accumulated in the accumulating process;

a first calculating process for calculating a packet loss rate transferred in the packet switching network and an error for the packet loss rate, based on the measured acquisition amount, the measured loss amount, and the measured acquisition leak amount; and an output process for outputting the calculated packet loss rate and the error for the packet loss rate.

2. The communication-quality measuring apparatus according to claim 1, wherein the processor is further configured to execute:

a second calculating process for calculating the loss rate of packets transferred in the packet switching network and the error for the packet loss rate, based on the measured acquisition amount and the measured loss amount measured by the measuring process; and a selecting process for selecting, as a packet loss rate and an error for the packet loss rate to be output, either one of a first result having the packet loss rate and the error for the packet loss rate calculated by the first calculating process or a second result having the packet loss rate and the error for the packet loss rate calculated by the second calculating process.

3. The communication-quality measuring apparatus according to claim 2, wherein the selecting process compares the error provided in the first result and the error provided in the second result so that a smaller error is selected.

4. The communication-quality measuring apparatus according to claim 1, wherein measurement of the loss amount by the measuring process is performed by analyzing information relating to a transfer order stored in a header of the acquired packet.

5. The communication-quality measuring apparatus according to claim 1, wherein the first calculating process comprises:

a transferred-amount calculating process for calculating a transferred amount of packets, based on a value obtained by totaling the measured acquisition amount, the measured loss amount, and the measured acquisition leak amount;

a minimum-value calculating process for calculating, as a minimum value of the packet loss rate, a ratio of the transferred amount with respect to the measured loss amount;

a maximum-value calculating process for calculating, as a maximum value of the packet loss rate, a ratio of the transferred amount to a value obtained by totaling the measured loss amount and acquisition leak amount; and an error calculating process for calculating a packet loss rate and an error for the packet loss rate based on the calculated minimum value and the calculated maximum value.

6. A communication-quality measuring method, comprising:

acquiring packets transferred in a packet switching network;

assigning a sequential number to the acquired packet in an acquired order;

accumulating, using an acquiring unit, the acquired packet in which the sequential number is assigned in an internal buffer;

measuring an acquisition amount indicating an amount of packets acquired per given unit time, a loss amount indicating an amount of packets lost during a transfer in the packet switching network, and an acquisition leak amount indicating an amount of packets, out of the acquired packets, that cannot be accumulated in the internal buffer, wherein the acquisition leak amount is obtained by detecting a skipped sequential number among the sequential number assigned to the acquired packet accumulated in the internal buffer;

calculating a packet loss rate of packets transferred in the packet switching network and an error for the packet loss rate based on the measured acquisition amount, the measured loss amount, and the measured acquisition leak amount; and outputting the calculated packet loss rate and the error for the packet loss rate.

7. The communication-quality measuring method according to claim 6, wherein measurement of the loss amount is performed by analyzing information relating to a transfer order stored in a header of the acquired packet.

8. The communication-quality measuring apparatus according to claim 6, wherein the packet loss rate and the error for the packet loss rate are calculated by:

calculating a transferred amount of packets based on a value obtained by totaling the measured acquisition amount, the measured loss amount, and the measured acquisition leak amount;

calculating, as a minimum value of the packet loss rate, a ratio of the transferred amount with respect to the measured loss amount;

calculating, as a maximum value of the packet loss rate, a ratio of the transferred amount to a value obtained by totaling the measured loss amount and the measured acquisition leak amount; and calculating a packet loss rate and an error for the packet loss rate based on the calculated minimum value and the calculated maximum value.

9. A computer-readable, non-transitory medium storing computer program causing a computer to perform a process, the process comprising:

acquiring packets transferred in a connected packet switching network;

assigning a sequential number to the acquired packet in an acquired order;

accumulating, using an acquiring unit, the acquired packet in an internal buffer;

measuring an acquisition amount indicating an amount of packets acquired per given unit time, a loss amount indicating an amount of packets lost during a transfer in the packet switching network, and an acquisition leak amount indicating an amount of packets, out of the acquired packets, that cannot be accumulated in the internal buffer, wherein the acquisition leak amount is obtained by detecting a skipped sequential number among the sequential number assigned to the acquired packet accumulated in the internal buffer;

calculating a packet loss rate of packets transferred in the packet switching network and an error for the packet loss rate, based on the measured acquisition amount, the measured loss amount, and the measured acquisition leak amount; and causing an output unit to output the calculated packet loss rate and error for the packet loss rate in an associated manner.

10. The computer-readable, non-transitory medium according to claim 9, wherein the process further comprises:
   calculating the packet loss rate of the packets transferred in the packet switching network and the error for the packet loss rate, based on the measured acquisition amount and the measured loss amount; and
   selecting, as a packet loss rate and an error for the packet loss rate to be output, either one of a first result having the packet loss rate of the packet calculated based on the measured acquisition amount, the measured loss amount, and the measured acquisition leak amount and the error for the packet loss rate or a second result having the packet loss rate of the packet calculated based on the measured acquisition amount and the measured loss amount and the error for the packet loss rate.

11. The computer-readable, non-transitory medium according to 10, wherein
   at the selecting the packet loss rate and the error for the packet loss rate to be output, the error provided in the first result and the error provided in the second result are compared so that a smaller error is selected.

12. The computer-readable, non-transitory medium according to 9, wherein the loss amount of the packet is caused to be measured by analyzing information relating to a transfer order stored in a header of the acquired packet.

13. The computer-readable, non-transitory medium according to 9, wherein calculating the packet loss rate and the error for the packet loss rate comprises:
   causing to calculate a transferred amount of packets based on a value obtained by totaling the measured acquisition amount, the measured loss amount, and the measured acquisition leak amount;
   causing to calculate, as a minimum value of the packet loss rate, a ratio of the transferred amount with respect to the measured loss amount;
   causing to calculate, as a maximum value of the packet loss rate, a ratio of the transferred amount with respect to a value obtained by totaling the measured loss amount and the measured acquisition leak amount; and
   causing to calculate the packet loss rate and the error for the packet loss rate, based on the calculated minimum value and maximum value.

\* \* \* \* \*